United States Patent [19]
Fazel et al.

[11] Patent Number: 5,467,132
[45] Date of Patent: Nov. 14, 1995

[54] METHOD FOR DIGITAL TRANSMISSION OF HIERARCHICAL HDTV, EDTV AND SDTV TELEVISION SIGNALS

[75] Inventors: Khaled Fazel, WeBling; Michael Ruf, München, both of Germany

[73] Assignee: Deutsche Forschungsansalt fur Luft-und Raumfahrt e.V., Köln, Germany

[21] Appl. No.: 158,436

[22] Filed: Nov. 29, 1993

[30] Foreign Application Priority Data

Nov. 30, 1992 [DE] Germany .......................... 42 40 226.3

[51] Int. Cl.⁶ .............................. H04N 11/06; H04N 11/04
[52] U.S. Cl. ........................ 348/390; 348/388; 348/408; 348/432; 348/399; 348/426; 371/31
[58] Field of Search .................................. 348/388, 389, 348/390, 399, 408, 432, 433, 426; 371/31, 41; 375/17, 34, 39, 60; H04N 11/06, 11/04, 11/12

[56] References Cited

U.S. PATENT DOCUMENTS

| | | | |
|---|---|---|---|
| 5,105,442 | 4/1992 | Wei | 379/39 |
| 5,134,464 | 7/1992 | Basile et al. | 348/426 |
| 5,243,428 | 9/1993 | Challapali et al. | 371/31 |
| 5,289,501 | 2/1994 | Seshadri et al. | 375/17 |

OTHER PUBLICATIONS

Fernseh und Kino—Technik, "Digital Television Transmission–System Concepts and Chances of Introduction." vol. 46, 1992. pp. 559–561, 566–568, 570.

Primary Examiner—James J. Groody
Assistant Examiner—Glenton B. Burgess
Attorney, Agent, or Firm—Browdy and Neimark

[57] ABSTRACT

For digital transmission of hierarchical HDTV, EDTV and SDTV television signals, on the transmission side after an analog/digital conversion of video and audio input signals and a subsequent removal of redundancy in a source coder, the signal bits are protected in a UEP coder in accordance with their significance. Thereafter, the hierarchically built up television signals (HDTV, EDTV and SDTV) are subjected to a multilevel coding and, combined to form symbols, to a multiresolution modulation and an OFD multiplexing and transmitted after digital/analog conversion. On the receiving side the transmitted signals, after analog/digital reconversion and inverse OED multiplexing (OFDM), are demodulated in a multiresolution demodulator and then decoded in a multistage decoder. Thereupon the data are processed by digital/analog conversion to HDTV, EDTV and SDTV signals in a UEP decoder specific to the respective receiver and a following source decoder.

3 Claims, 10 Drawing Sheets

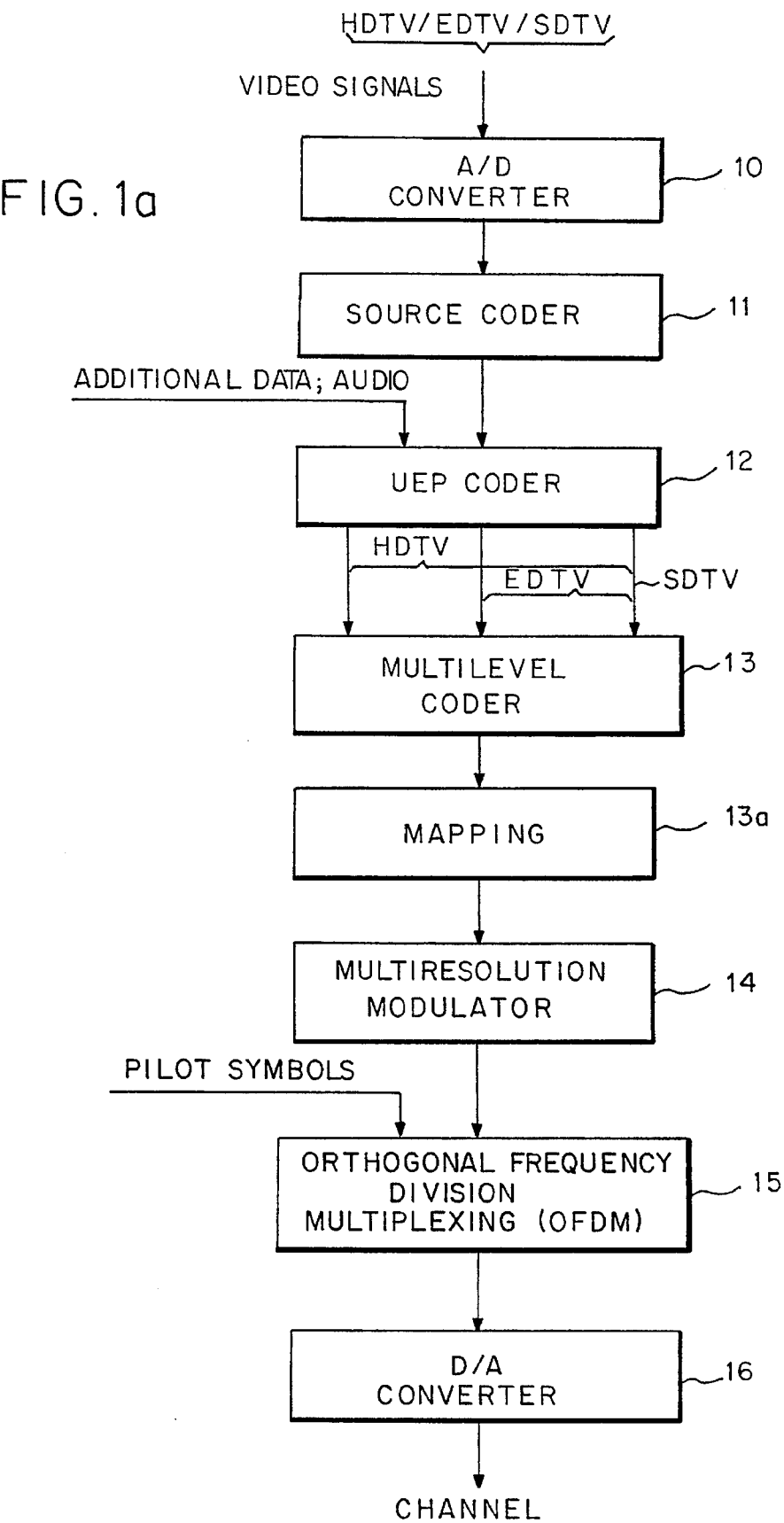

FIG. 2

| BER SDTV1 = $10^{-10}$ | BER EDTV1 = $10^{-8}$ | BER HDTV1 = $10^{-6}$ |

AWGN: (STATIONARY RECEPTION WITH DIRECTIONAL ANTENNA)

| BER SDTV2 = $10^{-8}$ | BER EDTV2 = $10^{-6}$ |

RICE-FADING CHANNEL: (PORTABLE RECEPTION WITH ROD ANTENNA)

| BER SDTV3 = $10^{-6}$ |

RAYLEIGH-FADING CHANNEL: (MOBILE RECEPTION)

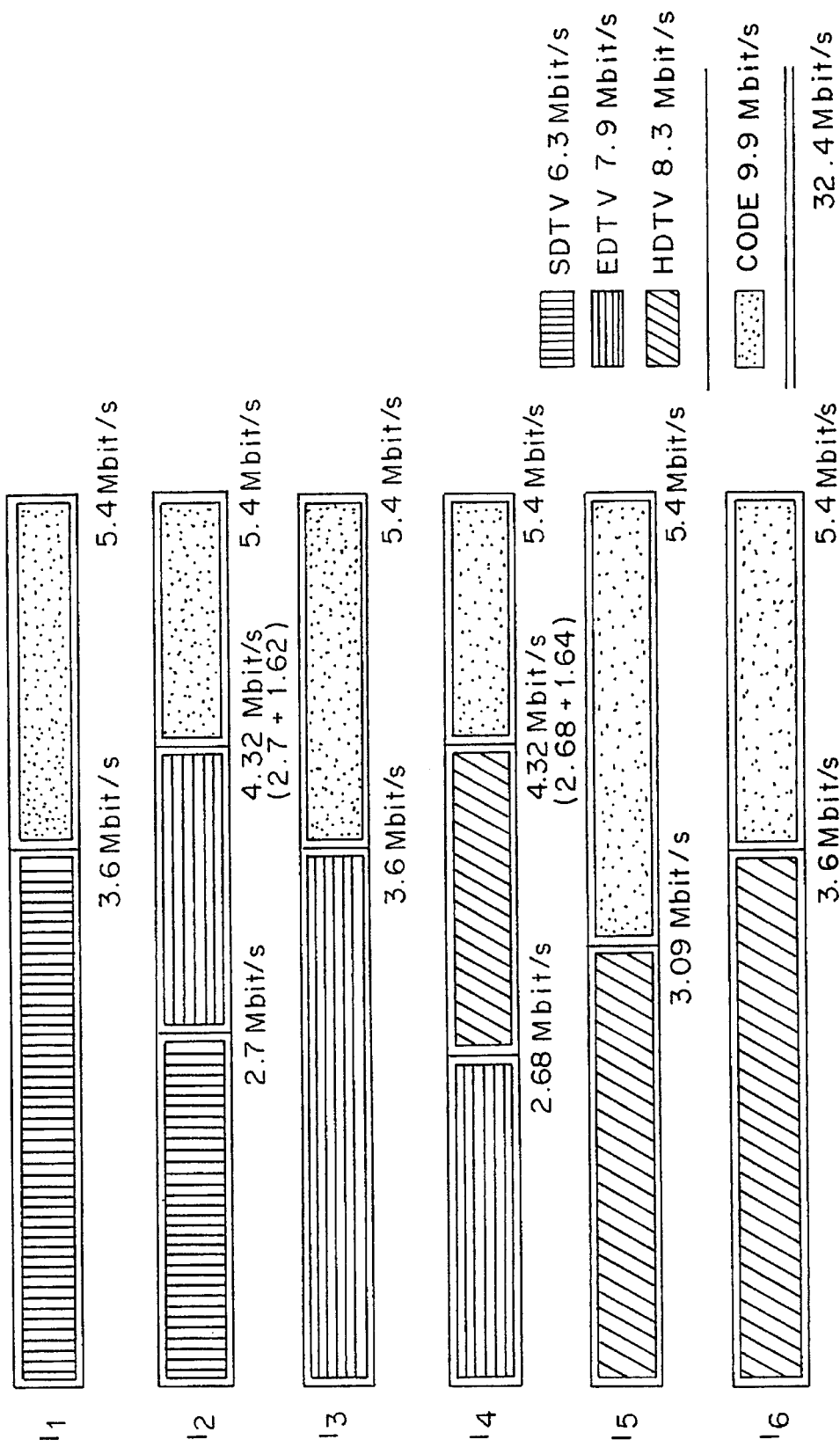

METHOD FOR DIGITAL TRANSMISSION OF HIERARCHICAL HDTV, EDTV AND SDTV TELEVISION SIGNALS

BACKGROUND OF THE INVENTION

1. Field of the Invention

The invention relates to a method for digital transmission of hierarchical HDTV, EDTV and SDTV television signals (HDTV=High Definition TV, EDTV=Extended Definition TV and SDTV=Standard Definition TV).

2. Description of the Prior Art

Multiresolution modulation is prior art for the transmission of digital hierarchical television signals (see K. K. Uz, K. Ramchandran and M. Vetterli, "Multiresolution source and channel coding for digital broadcast of HDTV" Fourth International Workshop on HDTV and beyond, Torino, September 1991; T. Cover, "Broadcast Channel", IEEE Trans. on IT, IT-18, pages 2 to 14, January 1972). For error protection in the transmission various channel coding methods are known, such as convolutional codes, block codes, and so on. In the combination of channel coding with modulation trellis-coded modulation (TCM) (cf. G. Ungerboeck, "Channel Coding with multilevel phase signals", IEEE trans. IT, Vol. IT-28, pages 55 to 67, January 1982), block-coded modulation (BCM) (cf. S. I. Sayegh, "A class of optimum block codes in signal space", IEEE Trans. on Com., COM-34, pages 1043 to 1045, October 1986) and multilevel coding (cf. A. R. Calderbank, "Multilevel codes and multistage decoding" IEEE Trans. on Com, COM-37, pages 222 to 229, March 1989) are known. For a more efficient transmission via a bandwidth limited channel, orthogonal frequency division (OFD) multiplexing is also used (cf. S. B. Weinstein and P. M. Ebert, "Data transmission by FDM using discrete Fourier Transform", IEEE Trans. on Com., COM-19, pages 628 to 634, October 1971).

With the means known at present transmission of digital hierarchical television signals is not possible in a 7 MHz channel when the following demands are to be satisfied.

(a) An extremely high total data rate is to be transmitted substantially free of error via the channel available.

(b) The differently weighted data are to be protected for channel errors in accordance with their priority.

(c) A modulation method is to be found in which the respective receivers can extract the required information from the data stream transmitted.

(d) Furthermore, a transmission method is to be found which permits different receiver compatible complexity corresponding to the quality of the received television signal.

(e) Furthermore, the method is to be devised so that error concealment and graceful degradation can be carried out as far as possible.

(f) The transmission method is to be devised so that a stationary, portable and mobile reception is possible with different respective transmission channels.

A hierarchical transmission of HDTV, EDTV and SDTV signals can be carried out with the multiresolution modulation without multilevel coding, but only when a considerably larger bandwidth is available for the transmission. Likewise, the transmission could be carried out with the known TCM and BCM methods, although only with the same very high receiver complexity and without graceful degradation.

Various other attempts have been made to meet some of the demands enumerated above under (a) to (g). As modulation method, at least a 64 quadrature amplitude modulation (QAM) should be used. In addition, channel coding is necessary to ensure that for a given symbol energy/ one side noise power (Es/No) and the particular channel properties the signal can be received with the desired bit error probability. It has further been suggested to transmit the various EDTV signals in a common signal by multiresolution modulation. This also made graceful degradation possible so as to obtain only a somewhat poorer television quality instead of total loss when the receiving conditions become worse.

SUMMARY OF THE INVENTION

The invention therefore has as its object to obtain with the methods available and their combination a digital transmission method for hierarchical television signals, such as HDTV, EDTV and SDTV, so that the particular signal required can be detected from a received signal consisting of the three television signals HDTV, EDTV and SDTV of different quality.

The invention therefore proposes a method for digital transmission of hierarchical HDTV, EDTV and SDTV television signals, wherein on the transmission side after an analog/digital conversion of video and audio input signals and a subsequent removal of redundancy in a source coder the signal bits are protected in accordance with their significance in a UEP encoder, the television signals (HDTV, EDTV and SDTV) hierarchically built up in the source coder and the following UEP encoder are subjected to a multilevel coding and, combined to form symbols, to a multiresolution modulation and thereafter to an OFD multiplexing, in order to be transmitted after a digital/analog conversion, and on the receiving side the received signals after an analog/digital reconversion and an inverse OFD multiplexing (OFDM) with the aid of a channel estimation (CSI) are demodulated in accordance with the various differently complex receivers (HDTV, EDTV, SDTV) in a multiresolution demodulator, thereafter decoded in a multistage decoder, followed by a UEP decoder whereupon the data are processed to HDTV, EDTV and SDTV signals specific to the respective receiver and a following source decoder, followed by a digital to analog conversion.

Expedient embodiments are defined by the features of the subsidiary claims.

For achieving the objective, in the method according to the invention for digital transmission of hierarchical television signals the methods of multilevel coding with multistage decoding, multiresolution modulation and orthogonal frequency division (OFD) multiplexing are linked together in optimum manner.

With the aid of the method according to the invention the hierarchical television signal consisting of HDTV, EDTV and SDTV components can be received in a terrestrial channel, a cable or a satellite channel under different reception conditions and with different receiver complexity. In addition, graceful degradation is made possible and error concealment is supported.

BRIEF DESCRIPTION OF THE DRAWINGS

The invention will be described in more detail hereinafter with reference to preferred examples of embodiment with the aid of the attached drawings, wherein:

FIG. 1a shows in the form of a block circuit diagram a transmitting-side processing of hierarchical HDTV, EDTV and SDTV signals;

FIG. 2 is a schematic illustration of required bit error rates with different transmission conditions;

FIG. 5b is a schematic illustration of a distribution of SDTV/EDTV/HDTV components amongst bit flows ($l_i$);

DESCRIPTION OF THE PREFERRED EMBODIMENTS

In FIG. 1a the transmitter-side processing of hierarchical HDTV, EDTV and SDTV signals is illustrated in a block circuit diagram. An analog video input signal is subjected to an analog/digital conversion in an AD converter 10. Since a data rate >1 Gbit/s is still involved here and only a channel bandwidth B of 7 Mhz is available between two adjacent channels, redundancy is removed from the video signal in the following source coder 11 so that a total data rate of the picture or video signal of about 20 Mbit/s is to be transmitted. In addition, sound or audio data and auxiliary data each of about 500 kbit/s are present.

The hierarchical HDTV/EDTV/SDTV signal consists of bits of different significance or weighting, i.e. a corruption of the bits during the transmission by channel disturbances has different effects in the subsequently recomposed television picture; this extends from errors which are hardly noticed up to complete loss of picture. For this reason, the bits are protected in accordance with their ranking or significance with a UEP (Unequal Error Protection) code in a UEP coder 12 (cf. K. Fazel, J. J. Lhuillier, "Transmission of images over bursty and random channels", Signal Processing V: Theories and Applications, pages 853 to 856, 1990). In doing this, a redundancy of about 7% is added to the total signal so that the protected hierarchical video signal now has a data rate of 21.6 Mbit/s.

In a further step the data are now prepared for the multiresolution modulation and the different transmission conditions. For this purpose, for a given ratio $E_s/N_o$ with the transmission conditions indicated in FIG. 2 the bit error probabilities $BER_{ij}$ given in FIG. 2 are required. The necessary bit error probabilities $BER_{ij}$ for the particular transmission conditions are achieved by an additional channel coding using rate-compatible punctured convolutional codes (RCPC) or block codes (cf. J. Hagenauer, "Rate-compatible punctured convolutional codes (RCPC codes) and their applications", IEEE Trans Commun., Vol COM-36, pages 389 to 400, April 1988). Here, the worst case of the required channel code is always decisive.

Figure 3A:
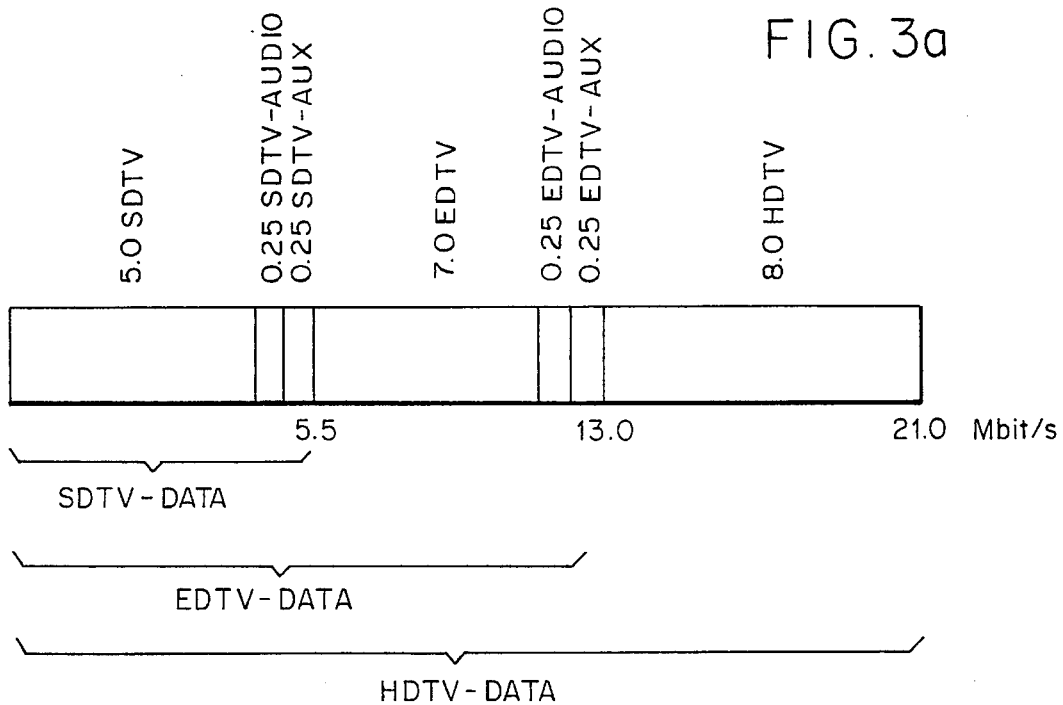
FIG. 3a is a schematic illustration of a composition of a hierarchical HDTV/EDTV/SDTV signal after a source coder.
Figure 3B:
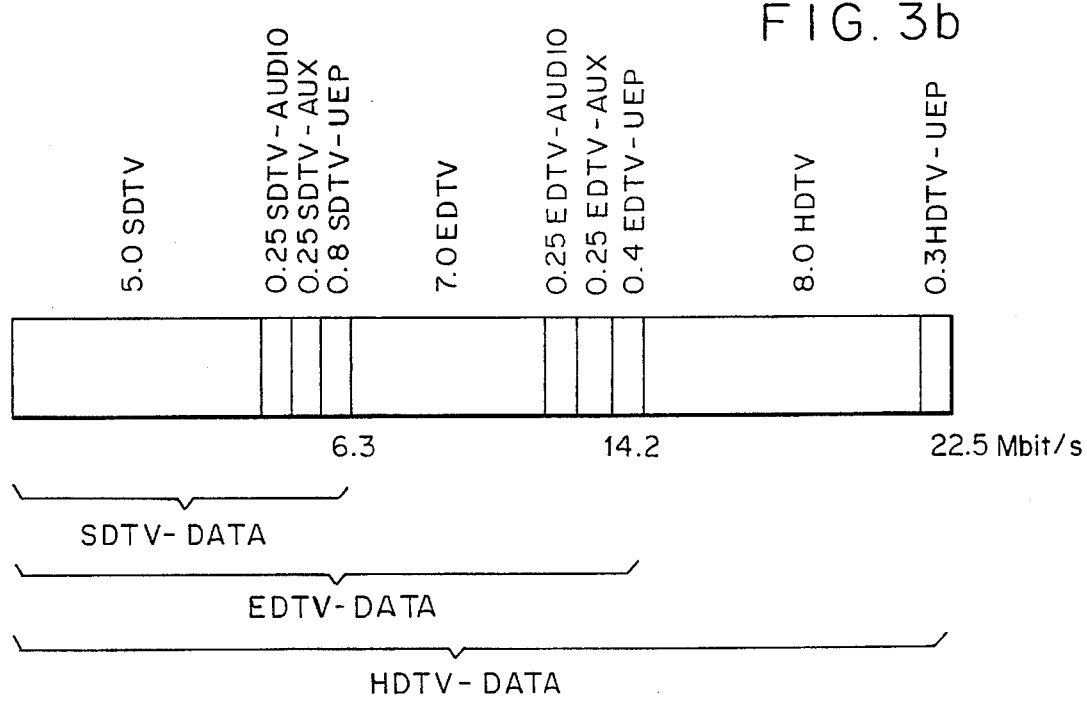
FIG. 3b is a schematic illustration of a composition of a hierarchical HDTV, EDTV, SDTV signal after a UEP coder.

Three hierarchically composed television signals, such as HDTV, EDTV and SDTV, can be taken from the source coder 11. The total picture is built up for example before and after the UEP coder 12 in the manner schematically illustrated in FIGS. 3a and 3b. The total signal after the UEP coder could consist of the following parts:

an SDTV component having a data rate of 6.8 Mbit/s which is made up of 5 Mbit/s for the video signal (SDTV), 0.25 Mbit/s for the audio component (SDTV), 0.25 Mbit/s for auxiliary data (SDTV) and 0.8 Mbit/s for the UEP code;

the additional EDTV component of 7 Mbit/s for the auxiliary EDTV video signal, comprising 0.25 Mbit/s audio component (EDTV), 0.25 Mbit/s auxiliary data (EDTV) and 0.4 M/s for the UEP code, and the auxiliary HDTV component having =b 10Mbit/s for the auxiliary HDTV video signal with 0.3 Mbit/s for the UEP code.

Thus, the total resulting data rate after the UEP coder 12 is 22.5 Mbit/s.

The three signal components are protected from channel disturbances in a following multilevel code 13 with RCPC codes, giving an additional redundancy of 30%, then combined to symbols each of six bits and transmitted by multiresolution modulation 14 and OFD multiplexing (OFDM) 15. For this purpose, for a subsequent inverse OFD multiplexing, the synchronization and the coherent detection, additional training sequences of the order of magnitude of the data rate of 0.6 Mbit/s are added to the data coded by the multilevel coder 13 so that the total signal now has a rate of about 33 Mbit/s.

In OFD multiplexing, for example with a symbol duration $T_S$=250 µs for example a carrier interval of $1/T_S$=1/250 µs=4 kHz is assumed. For a protective interval of $T_G$=30 µs this gives a data rate of $1/T=1/T_S+T_G$= 1/280 µs=3.571 ksymb/s. Furthermore, if for example a useful channel bandwidth B=6.144 MHz in a channel raster of 7 MHz is assumed, then $0.75 \cdot 2^{11}$=1536 carriers with the carrier interval 4 kHz can be accommodated therein. This gives a maximum transmittable data rate of 1536·3.571 ksymb/s=5.49 Msymb/s and when using the 64 QAM for the multiresolution modulation a transmittable data rate of about 33 Mbit/s. The processed transmission signal prepared for the OFD multiplexing (OFDM) is thus to be transmitted with this arrangement.

After a digital/analog conversion in a following D/A converter 16 the data thus prepared are then transmitted via the channel available with the bandwidth B=7 MHz. This channel may be either a terrestrial channel, a cable channel or a satellite channel.

Figure 1B:
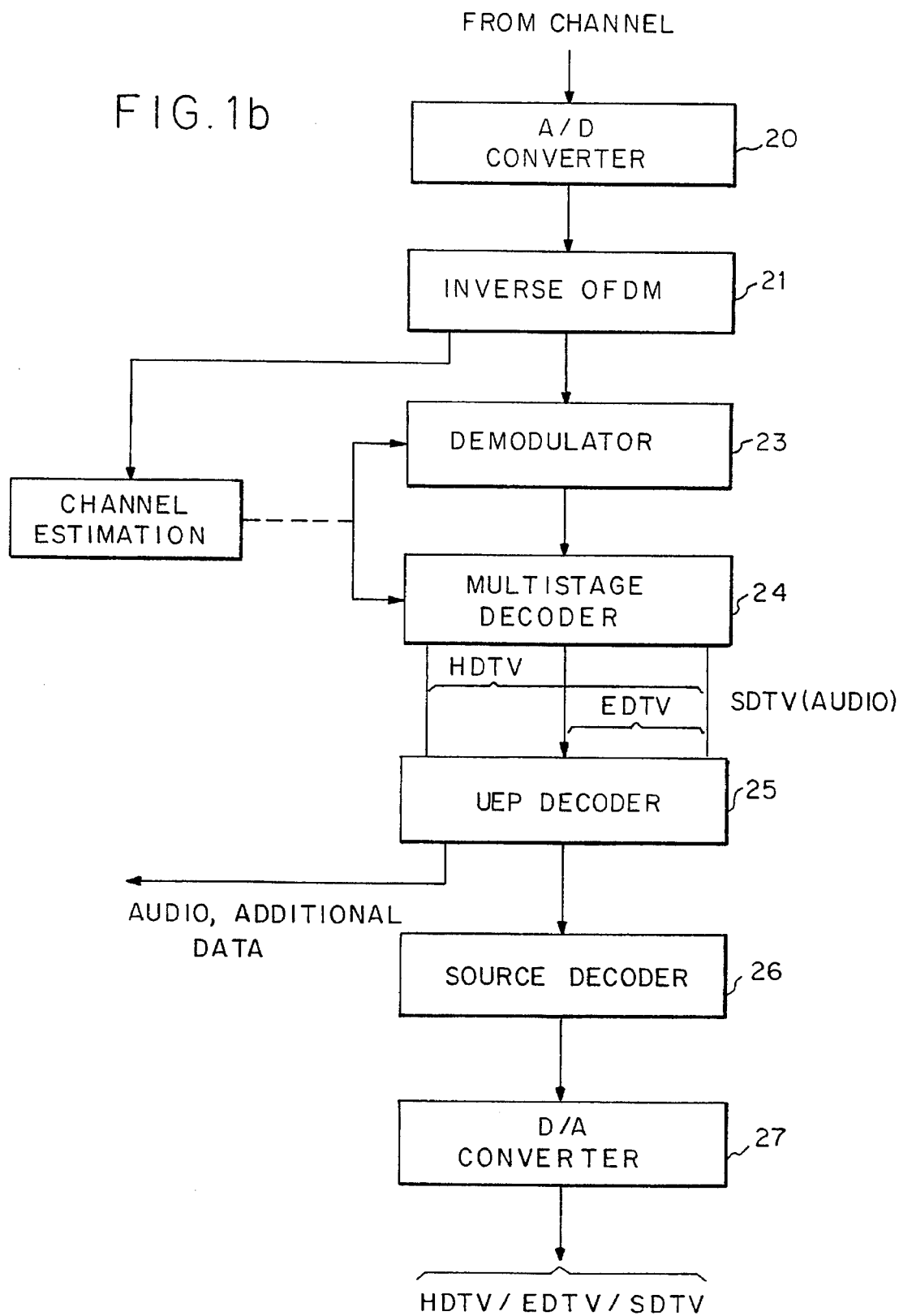
FIG. 1b shows in the form of a further block diagram a receiving-side processing of the received HDTV, EDTV and SDTV signals.

As can be seen from the block circuit diagram of FIG. 1b, on the receiving side after an analog/digital conversion in an A/D converter 20 and after an inverse frequency demultiplexing (0FDM) 21 with the aid of a channel estimation (CSI Channel State Information) 22, a demodulation is carried out. This is done with different receivers of different complexity depending on the desired television signal. The required substreams are received by means of a coherent detection and a multistage decoding. When using a soft output Viterbi decoder (SOVA; cf. J. Hagenauer and P. Höher, "A Viterbi algorithm with soft-decision outputs and its applications", in Proc GLOBECOM'89, Dallas, Tex., pages 47.1.1. to 47.1.7, November 1989) the RCPC codes used here also enable reliability information to be supplied to a following UEP coder 25. A hierarchical source decoder depending upon the receiver (HDTV, EDTV, SDTV) reconstructs the television signal with corresponding picture quality and finally the desired television signal is available after a digital/analog conversion in a D/A converter 27.

The respective receiver here performs a coherent detection and the inverse OFD demultiplexing (OFDM), estimates the channel state and passes the channel state estimation (CSI) 22 onto a multiresolution demodulator 23 and the multistage decoder 24. The simply constructed SDTV receiver now recovers here the data intended for it, the somewhat more complex EDTV receiver obtaining in addition to the remaining EDTV component and the complex HDTV receiver the total signal information, passing the respective data onto the specific UEP decoder 25 and source decoder 26.

Figure 4A:
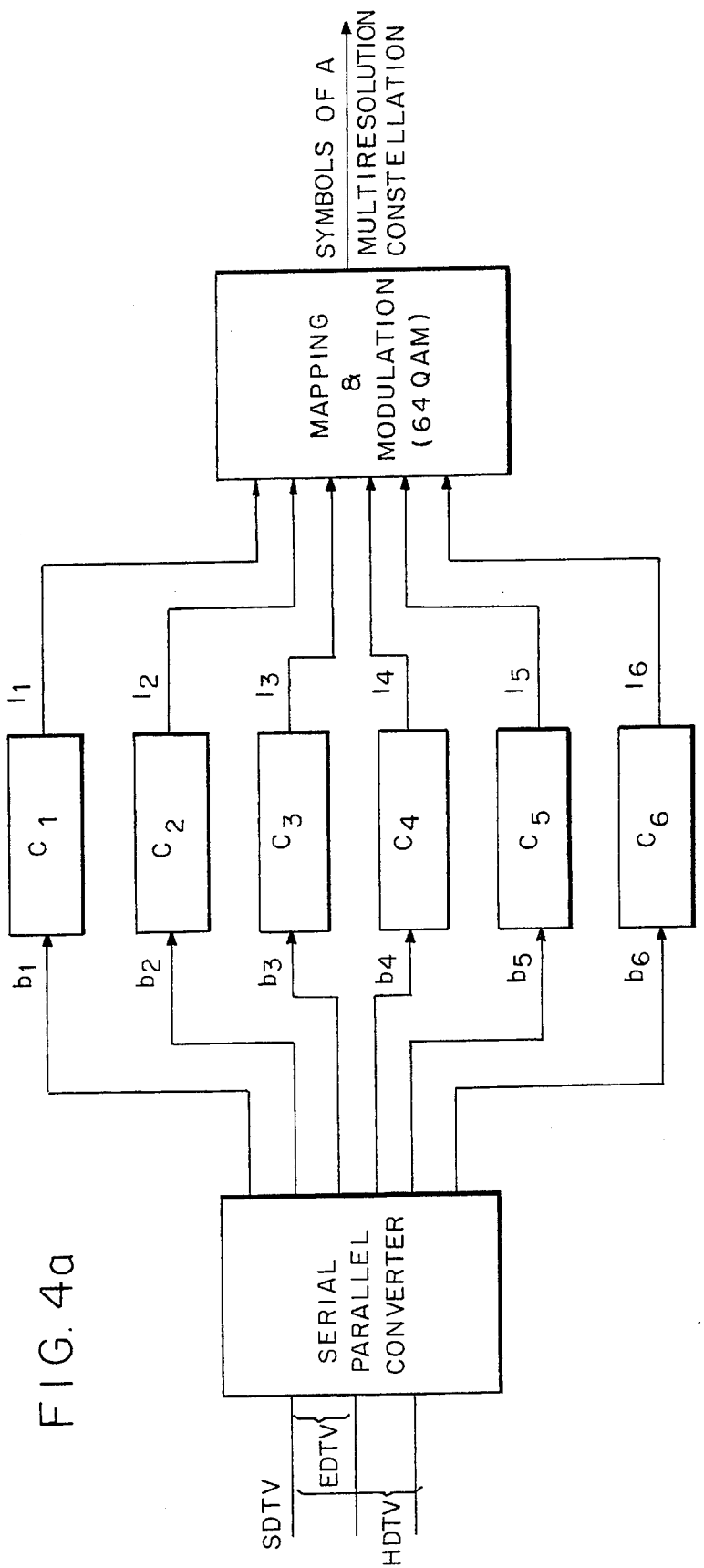
FIG. 4a is a schematic illustration of multilevel coding.
Figure 5A:
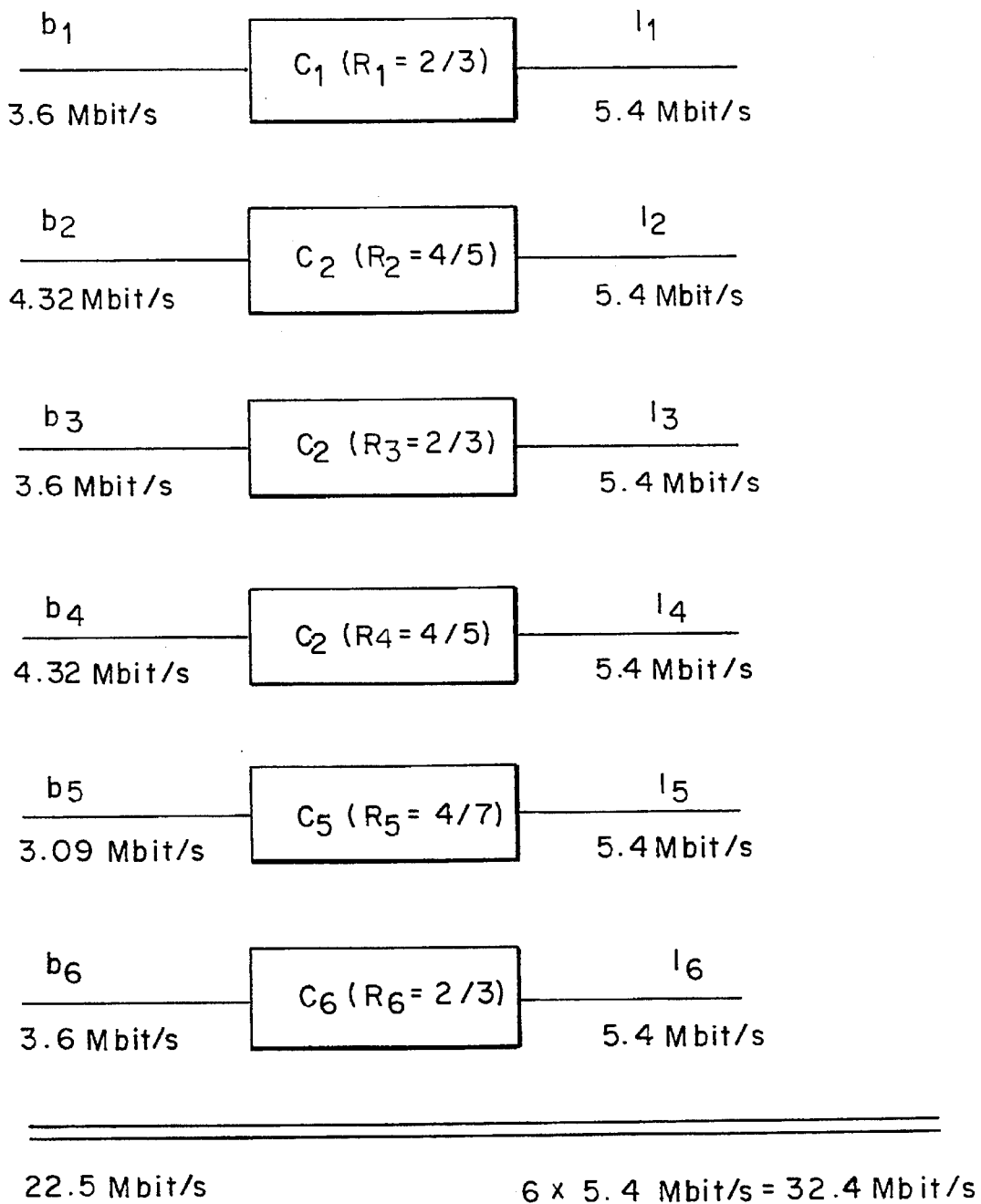
FIG. 5a is a schematic illustration of code rates $C_i$ of a multilevel code.

The basic idea here is to protect the symbol to be transmitted with 64 QAM and consisting of 6 bits per symbol from channel disturbances. By using multilevel encoding on the transmitting side and using multistage decoding on the receiving side, different channel codes selected in optimum manner may now also be applied to the individual bits of the symbol. These channel codes are now either RCPC codes or block codes. According to the invention, after a serial/parallel conversion of the three television data streams as illustrated in FIG. 4a, RCPC codes are selected for the codes $C_1$ to $C_6$ because this makes it possible to meet the requirements regarding a single Viterbi or SOVA decoder and reliability information for the UEP decoder 25, as well as for error concealment. The data streams $b_i$ with i=1 ... 6 are converted to the bit streams $l_i$ with the codes $C_i$. The scheme shown for example in FIG. 5a holds true here. After the multilevel coding the hierarchical television signal is now distributed amongst the bit streams $l_i$ in such a manner that the SDTV signal is transmitted only within the streams $l_1$, $l_2$, the EDTV signal within the bit streams $l_1$ to $l_4$ and the HDTV signal in all the bit streams $l_1$ to $l_6$, as apparent from the schematic illustration of FIG. 5b. Now, in each case one (1) bit of the six (6) substreams $l_i$ are combined to form a symbol and associated with a signal point in the 64 QAM multiresolution space.

After the distribution of the hierarchical television signals indicated in FIG. 5b there is also the possibility of subjecting the HDTV subsignal (EDTV subsignal) to an additional UEP (Unequal Error Protection) by distributing the subsignal amongst the substreams $l_1$ to $l_6$ and $l_1$ to $l_4$ depending on the demands set for the reliable error bit rate.

Figure 6A:
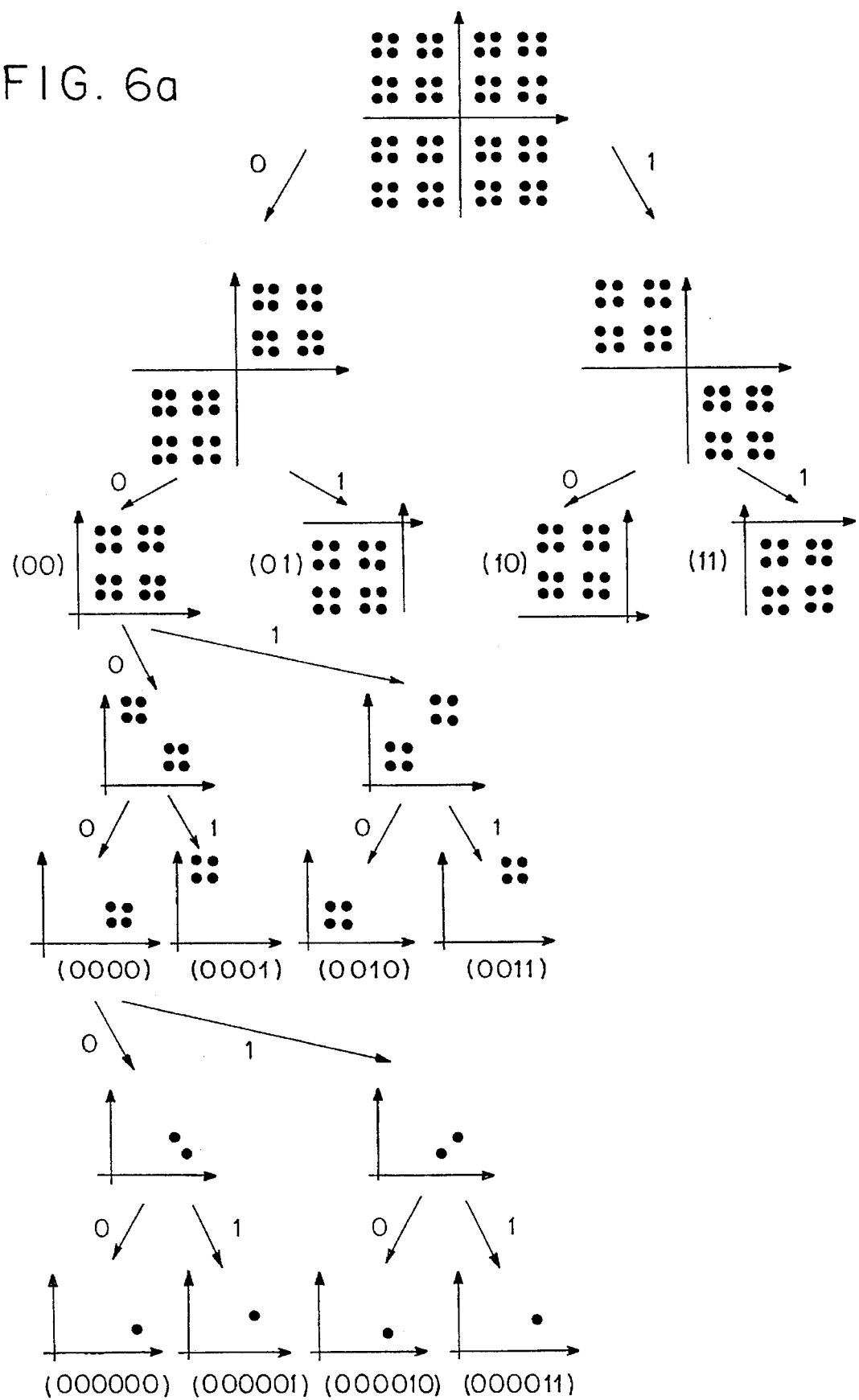
FIG. 6a is a schematic illustration of multiresolution set-partitioning.
Figure 6B:
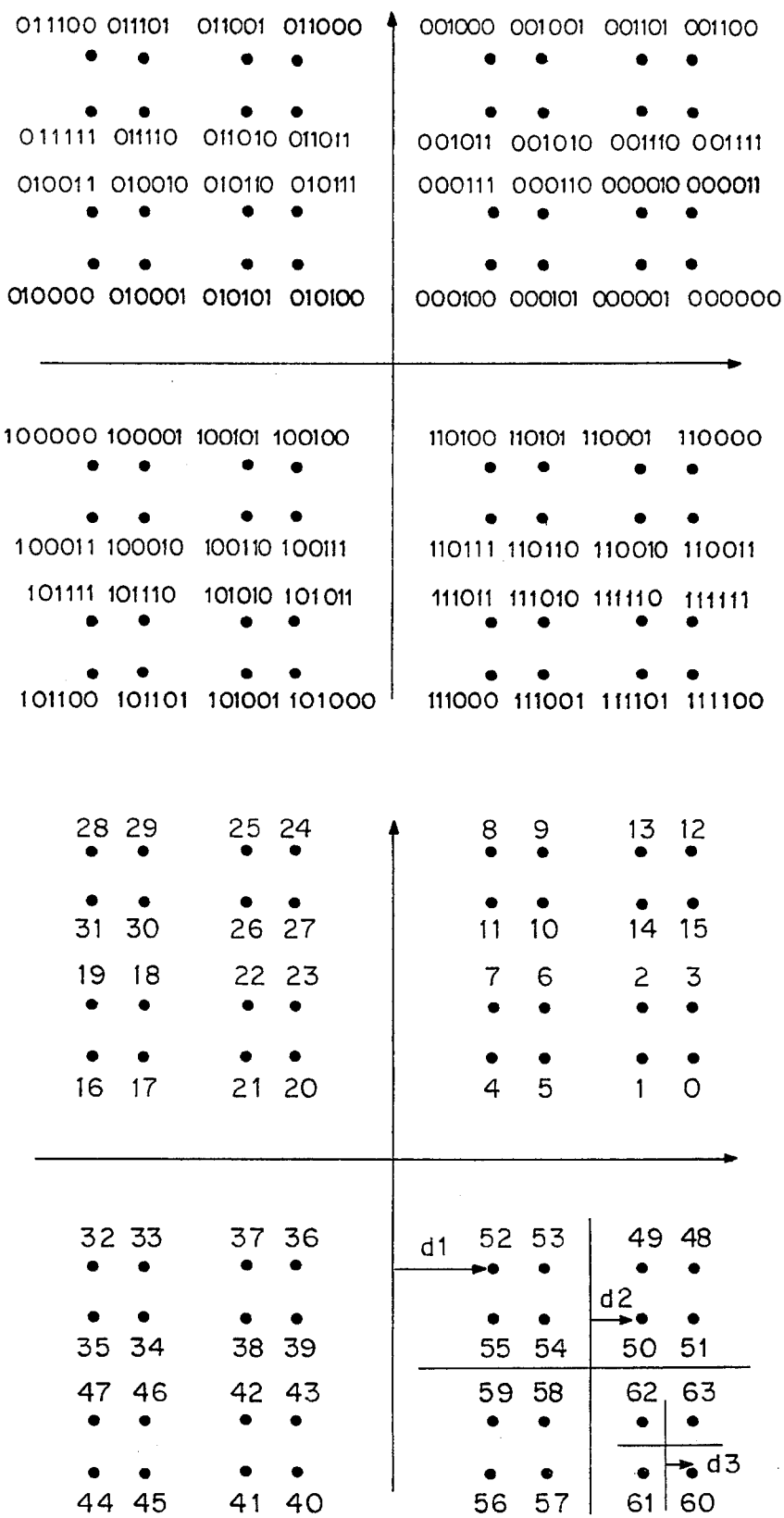
FIG. 6b is a schematic illustration of multiresolution mapping.

The objective of a multiresolution modulation is to adapt the detection complexity and thus the decoder complexibility of the respective television receiver to the desired picture quality by a suitable set partitioning $S_i$ with i=1 ... 6. Consequently, according to the invention the multiresolution set partitioning shown in FIGS. 6a and 6b has been chosen. It can be seen in FIGS. 6a and 6b that for the detection of the SDTV signal, i.e. the data streams $l_1$ and $l_2$, only the detection up to the second (2nd) set partition ($S_1$ and $S_2$) is necessary. The two substreams $b_{1'}$ and $b_{2'}$ are then present and the SDTV receiver can reconstruct the SDTV television signal.

For the EDTV receiver knowledge of the data streams $b_{1'}$ to $b_{4'}$ is necessary; consequently, this receiver must conduct the detection up to the fifth (5th) set partition ($S_1$ to $S_4$). Finally, by a detection up to the sixth (6th) set partition ($S_1$ to $S_6$) the HDTV receiver obtains the entire signal and can thus recover the full HDTV picture quality.

Figure 4B:
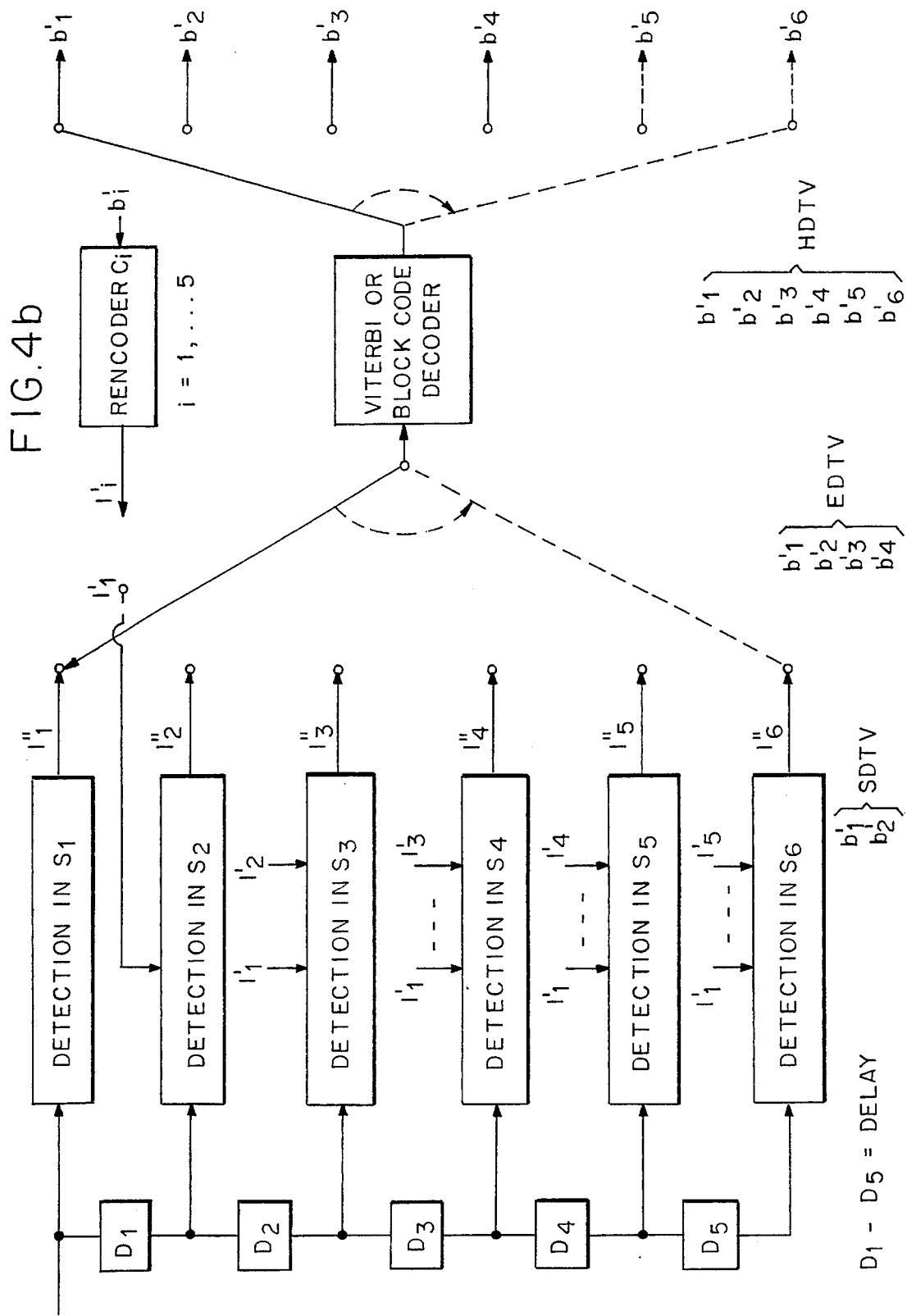
FIG. 4b is a schematic illustration of multistage decoding.

For decoding the substreams received a multistage decoding is carried out as apparent from FIG. 4b. A substream $l_{1''}$ is reconverted to a data stream $b_{1'}$ by a Viterbi, SOVA or block code decoder. Now, to obtain better detection for the substream $1^{2''}$, the data stream $b_{1'}$ is again encoded with the code $C_1$ so that the substream $l_1$—having less bit errors than the substream $l_{1''}$—is obtained and said substream $l_{1'}$ is employed as starting sequence for the detection in the set partition $S_2$. This procedure is repeated for the following substreams until the respective receiver has received the data streams $b_{i'}$ which it requires. The graduated complexity of the decoders is again apparent here. The SDTV receiver needs only to decode two sub-bit streams to obtain the SDTV television signal contained in the data streams $b_{1'}$ and $b_{2'}$. The EDTV receiver must decode four sub-bit streams to obtain the data streams $b_{1'}$ to $b_{4'}$, and the HDTV receiver must decode all 6 sub-bit streams to obtain the full HDTV television signal $b_{1'}$ to $b_{6'}$. Consequently, the decoding complexity of the receivers behaves as follows:

*SDTV/EDTV/HDTV=1/2/3.*

Consequently the required graduated receiver complexity is obtained by the multiresolution modulation and the multistage decoding.

To avoid any abrupt picture loss when the receiving conditions for HDTV and EDTV deteriorate, according to the invention a graceful degradation is possible. For example, if in the HDTV receiver the video error rate of the auxiliary HDTV data exceeds the extent allowed, representing a corresponding bit loss, the HDTV receiver can switch to EDTV quality. This switching is certainly perceived by the viewer to be far less troublesome than a breakdown of the picture. The change from HDTV to EDTV quality is possible because the EDTV data $b_{1'}$ to $b_{4'}$ are as a rule disturbed or falsified far less than highly sensitive HDTV auxiliary data ($b_{5'}$, $b_{6'}$). In the same manner, graceful degradation is possible in the event of more difficult EDTV reception by switching from EDTV to SDTV quality, since the bit error rate of the SDTV data ($b_{1'}$, $b_{2'}$) is less compared with the auxiliary EDTV data ($b_{3'}$, $b_{4'}$) less protected from bit errors.

A further possibility of avoiding great quality losses by transfer errors is afforded by the method of the so-called error concealment. This method is made possible by using reliability information on the received data (bits). If for example instead of the Viterbi decoder an SOVA decoder is employed for the decoding of the substreams $l_{i'}$, with a high error probability of the decoded bits parts of the preceding image can be used for the current (highly probably greatly disturbed) image. This again leads to a greatly improved picture impression compared with an image disturbed by bit errors because no highly distorted, displaced or black disturbance points result.

Since the transmission properties depend greatly on the desired television quality, the method of a combined multilevel coding/multiresolution modulation must be adaptable in optimum manner thereto. According to the invention the video error rates to be expected in the different substreams $b_1$ to $b_6$ are adapted to the particular transmission properties. As already indicated in FIG. 2, the codes $C_1$ and $C_2$ are selected in accordance with the necessary bit error probability of the data streams $b_1$ and $b_2$ so that all the bit error probabilities (SDTV, EDTV, HDTV) are maintained under all possible reception conditions. Accordingly, the auxiliary EDTV data $b_3$ and $b_4$ must be protected in such a manner that in the case of stationary reception a bit error rate BER <10>>−8 is maintained and in the case of portable reception a bit error rate BER <10>>−6. Finally, for stationary reception the bit error BER <>>−6 of the data streams $b_5$ must be observed. This adaptation can be effected in optimum manner in accordance with the invention, this being due to the linking of multilevel coding and multiresolution modulation by selection of the system parameters $\alpha_1$ and $\alpha_2$, i.e. the multiresolution parameters given in FIG. 6b and the multilevel parameters $C_1$ to $C_6$.

Thus, for example, with the method according to the invention for a given ratio $E_S/N_O$=20 dB ($E_B/N_O$=15 dB)

under all reception conditions the required bit error probabilities of the individual subsignals can be achieved, and a data rate of 21 Mbit/s can be transmitted via a channel of 7 MHz. In addition, a complexibility adapted to the television quality is ensured with the method according to the invention. Furthermore, by employing graceful degradation and error concealment it is possible to improve the visual impression under deteriorated reception conditions and with channel disturbances so that abrupt loss of picture and pronounced reductions of picture quality can be countered. This applies both to transmission via terrestrial channels and via cable and satellite channels.

The method according to the invention is applicable to any type of hierarchical data transmission, i.e. for audio, video and other data with hierarchical array. With the method according to the invention the hierarchical data can be optimized for any transmission and reception conditions by means of the combined multilevel decoding and multiresolution modulation. Furthermore, the method according to the invention is not restricted to three hierarchical quality steps. By employing a different number of symbols of the QAM the method according to the invention can be restricted to two hierarchies or also expanded to more than three hierarchies.

We claim:

1. A method for hierarchical transmission of television signals, the television signals being analog signals and selectively including at least two of HDTV signals, EDTV signals, and SDTV signals, the television signals moving from a transmission side to a receiving side, the method comprising, on the transmission side:

converting the television signals to digital signals, such that the digital signals include signal bits;

removing signal bit redundancy from the digital signals in a source coder;

protecting the signal bits in accordance with their significance in a UEP coder, whereby the digital signals are hierarchically built up;

multilevel encoding the digital signals to form symbols;

multiresolution modulating the digital signals;

OFD multiplexing the digital signals;

converting the digital signals to analog signals; and transmitting the analog signals; the method further comprising, on the receiving side:

re-converting the analog signals to the digital signals;

inverse OFD multiplexing the digital signals;

demodulating the digital signals in a multiresolution demodulator according to a channel estimation, the multiresolution demodulator including various differently complex receivers selectively for the HDTV signals, the EDTV signals, and the SDTV signals;

decoding the digital signals in a multistage decoder;

processing the HDTV signals, the EDTV signals, and the SDTV signals by a digital-to-analog conversion in a UEP decoder specific to a respective one of the differently complex receivers and a following source decoder.

2. The method according to claim 1, wherein for transmission under different transmission and reception conditions individual signal components of the HDTV signals, the EDTV signals, and the SDTV signals are protected with the aid of different channel coding by multilevel coding.

3. The method according to claim 1, wherein the symbols are mapped in the multiresolution modulation signal space by means of set partitioning.

\* \* \* \* \*